(12) United States Patent
Uchida et al.

(10) Patent No.: US 8,045,018 B2
(45) Date of Patent: Oct. 25, 2011

(54) PICTURE RECORDING DEVICE

(75) Inventors: Tomokazu Uchida, Kyoto (JP); Kenji Iwahashi, Osaka (JP)

(73) Assignee: Panasonic Corporation, Osaka (JP)

(*) Notice: Subject to any disclaimer, the term of this patent is extended or adjusted under 35 U.S.C. 154(b) by 780 days.

(21) Appl. No.: 11/798,326

(22) Filed: May 11, 2007

(65) Prior Publication Data

US 2007/0268384 A1 Nov. 22, 2007

(30) Foreign Application Priority Data

May 11, 2006 (JP) ................................. 2006-132379

(51) Int. Cl.
- H04N 5/76 (2006.01)
- H04N 7/14 (2006.01)
- H04N 5/225 (2006.01)
- H04N 5/228 (2006.01)
- H04N 5/262 (2006.01)
- H04N 5/222 (2006.01)
- H04N 5/445 (2006.01)

(52) U.S. Cl. ............... 348/231.2; 348/14.13; 348/218.1; 348/222.1; 348/231.99; 348/240.99; 348/240.2; 348/333.01; 348/333.05; 348/568

(58) Field of Classification Search ............... 348/240.2, 348/218.1, 222.1, 231.99, 231.2, 231.7, 333.05, 348/333.11, 333.12
See application file for complete search history.

(56) References Cited

U.S. PATENT DOCUMENTS

| | | | | |
|---|---|---|---|---|
| 6,958,774 B2* | 10/2005 | Kuroiwa | .................... | 348/231.1 |
| 7,609,896 B2* | 10/2009 | Shiina | ........................... | 382/232 |
| 7,830,421 B2* | 11/2010 | Kawachi | ..................... | 348/231.2 |
| 2002/0097326 A1* | 7/2002 | Kuroiwa | ....................... | 348/231 |
| 2005/0200725 A1 | 9/2005 | Masumoto et al. | | |
| 2005/0213830 A1 | 9/2005 | Nagashima | | |
| 2005/0225659 A1* | 10/2005 | Kazami | ..................... | 348/333.12 |
| 2006/0008159 A1 | 1/2006 | Kobayashi | | |
| 2006/0083479 A1 | 4/2006 | Iwasaki et al. | | |

FOREIGN PATENT DOCUMENTS

| | | |
|---|---|---|
| CN | 1750593 | 3/2006 |
| EP | 0952729 A2 * | 10/1999 |
| JP | 11-308569 | 11/1999 |
| JP | 2005-236496 | 9/2005 |
| JP | 2006-033089 | 2/2006 |

OTHER PUBLICATIONS

English translation of Chinese Office Action issued in Chinese Patent Application No. 200710106836.X, mailed Mar. 2, 2010.
Japanese Office Action issued in Japanese Patent Application No. 2006-132379, dated Dec. 22, 2010.

* cited by examiner

Primary Examiner — Timothy J Henn
Assistant Examiner — Michael Osinski
(74) Attorney, Agent, or Firm — McDermott Will & Emery LLP

(57) ABSTRACT

An imaging processing unit signal-processes main picture data outputted from an imaging device. A zoom processing unit subjects the signal-processed main picture data to picture resize processing. A display picture management unit subjects the signal-processed main picture data to resize processing by the zoom processing unit to generate display picture data, aside from the main picture data recorded onto a recording medium at the time of photographing, and temporarily stores the display picture data in a memory area set inside or outside the integrated circuit. A display picture processing unit subjects the main picture data and the display picture data to display processing.

4 Claims, 5 Drawing Sheets

F I G. 1
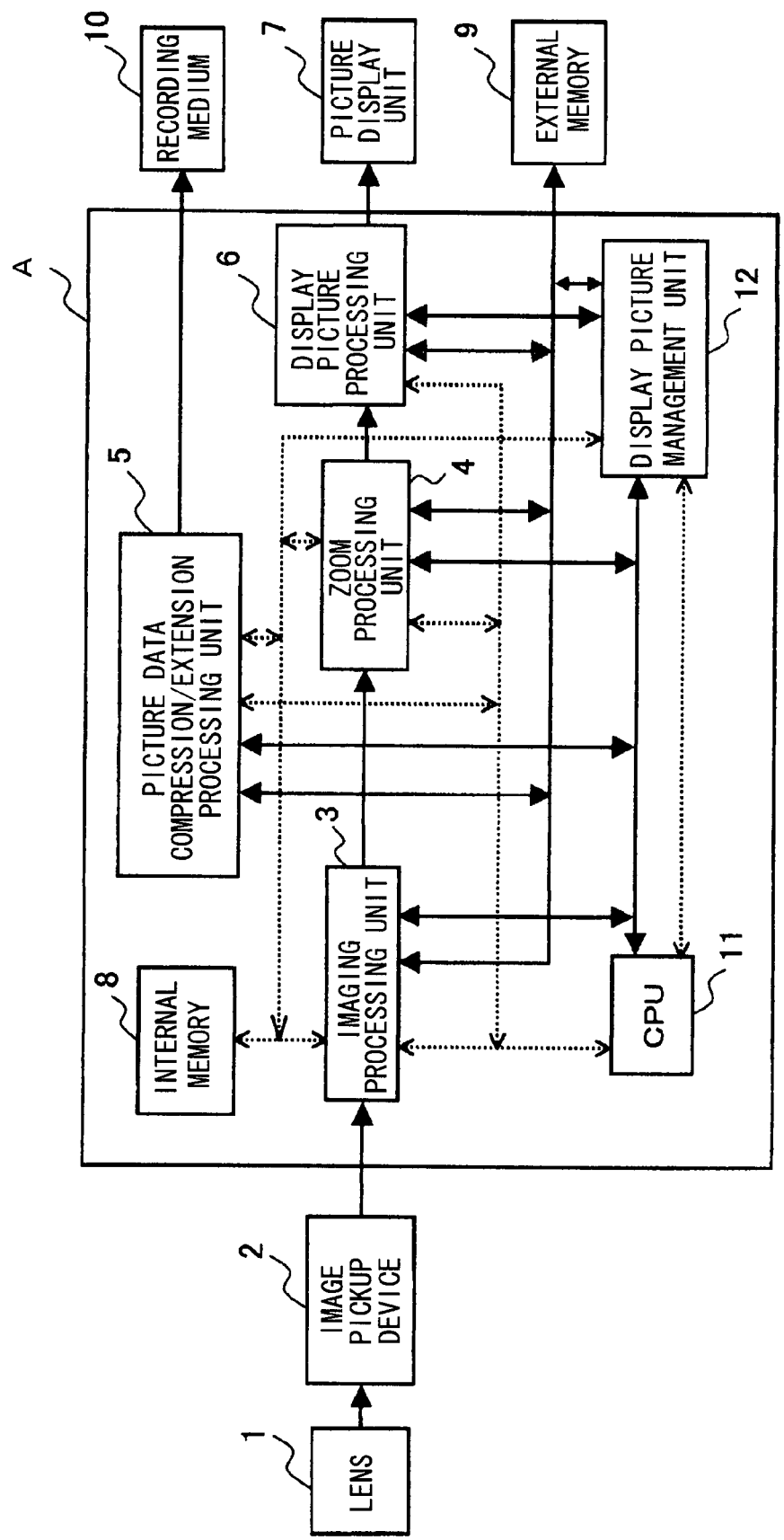

PICTURE RECORDING DEVICE

BACKGROUND OF THE INVENTION

1. Field of the Invention

The present invention relates to a picture recording device which records main picture data obtained by photographing onto a recording medium, and more specifically, relates to a technique shortening time necessary to display when a picture id selected in reproduction mode.

2. Description of the Related Art

In recent years, many digital cameras have been commercialized and widespread at home. Most of digital cameras have display units such as LCD (Liquid Crystal Display) so as to be able to check a photographed picture on the spot.

In recording processing of a digital camera, picture data obtained by photoelectric conversion is recorded onto a recording medium (portable recording medium) such as a semiconductor memory by performing compression processing. JPEG (Joint Photographic Experts Group) is typically applied as compression processing. Two kinds of picture data including main picture data where the number of pixels is set before photographing and thumbnail picture data with picture size smaller than that of the main picture data are recorded into a file.

In reproduction processing of a digital camera, arbitrary picture data is selected from a plurality of pieces of picture data recorded onto a recording medium, and the selected picture data is resized to display size to be displayed on the display unit of the camera body. Alternatively, display picture data including a group of pictures obtained through pasting a plurality of pieces of picture data recorded onto a recording medium on a display frame region is displayed on the display unit of the camera body.

A conventional digital camera typically uses picture data recorded onto a recording medium in reproducing and displaying. It is necessary to increase the number of pixels for recording picture data of higher resolution. According to the advancement of image pickup devices and the like, the number of pixels is increasing year by year. In proportion to it, a size of a picture file recorded onto a recording medium is also increasing.

As a result, time and load required for reading processing, extension processing and picture resize processing of main picture data with high-definition from a recording medium are increasing. When a picture is selected in reproduction mode, it cannot be displayed immediately. A sense of discomfort in operation cannot be erased because picture is not displayed soon even if it is selected in reproduction mode. When display is changed, since time for reproduction processing of picture data displayed next is required, picture data cannot be selected quickly.

There is a digital camera that can change picture data quickly by displaying thumbnail picture data in place of main picture data. The thumbnail picture data has a picture quality lower than that of the main picture data with high-definition.

Further, there is a devised configuration in which picture display of thumbnail picture data is performed first, extension processing of main picture data is performed during the display, and display is changed from the thumbnail picture data to the main picture data when extension processing of the main picture data is completed. However, the main picture data is handled also in this improvement. Thus it is difficult to reduce load.

Except the example described above, as illustrated in Japanese laid-open patent document (Japanese Patent Application Laid-Open (JP-A) No. 2005-236496), there is also a devised configuration in which display picture data matched with display size is stored aside from main picture data and thumbnail picture data, and then the display picture data is displayed after performing extension processing thereto. However, it takes long time to read the display picture data from a recording medium. Since picture data is recorded onto a recording medium in this configuration, the number of pictures recorded onto the recording medium is reduced.

Aside from reproduction of one picture, in reproduction of display picture data including a group of pictures, since a plurality of pieces of picture data are read from a recording medium and then are pasted on the display frame region for display, reading processing of picture data equal to number of pieces displayed on one screen from the recording medium, extension processing of the read picture data, and resize processing to arbitrary size have to be performed. It takes long time as in reproduction of one picture.

SUMMARY OF THE INVENTION

A main object of the present invention is to display a high-quality picture while shortening time required for display when it is selected in reproduction mode.

A semiconductor integrated circuit according to the present invention used for a picture recording device which records main picture data photographed by an imaging device onto a recording medium, includes:

an imaging processing unit for signal-processing the main picture data outputted from the image pickup device;

a zoom processing unit for performing picture resize processing in the main picture data signal-processed by the imaging processing unit;

a display picture management unit for temporarily storing the display picture data in a memory area set inside or outside the integrated circuit after implementing resize processing by the zoom processing unit to the signal-processed main picture data in order to generate display picture data, aside from the main picture data recorded onto the recording medium at the time of photographing; and a display picture processing unit for performing display processing to the main picture data and the display picture data.

In this configuration, when the main picture data is recorded with imaging, aside from recording of the main picture data, the display picture management unit generates the display picture data to temporarily store it in the memory area, and in this regard, stores the display picture data by the number of pixels matched with a predetermined display frame region. When the display picture data is reproduced, the picture data need not to be resized to display size. Herewith, at the time of reproducing the display picture data, the display processing speed of the display picture data can be higher than that of the conventional configuration that reads the main picture data from the recording medium to generate the display picture data.

Furthermore, there is an embodiment that the display picture processing unit generates at least any one of "display picture data including a group of pictures in which a plurality of pictures are pasted on a display frame region" and "display picture data including one picture matched with a display frame region", as the display picture data.

Additionally, there is an embodiment that the display picture processing unit compresses the display picture data to store it in the memory area. By doing this, significant increase in the display processing speed can be realized in the case of temporarily storing the compressed display picture data in the memory area as compared with the case of reading the display picture data from the recording medium to perform extension processing for display.

There is an embodiment that the display picture management unit temporarily stores the display picture data including pictures in the memory area without compressing it, when the main picture data has not obtained up to the maximum number of the pictures pasted on the display frame region, in generating "display picture data including a group of pictures in which a plurality of pictures are pasted on a display frame region" as the display picture data. By doing this, the display picture data is temporarily stored in the memory area without being compressed when the number of the pictures pasted is less than the maximum. The processing time can be shortened.

Furthermore, there is an embodiment that the display picture management unit generates "display picture data including one picture matched with a display frame region" as the display picture data in order to temporarily store it in the memory area. Herewith, reading processing of the display picture data from the recording medium can be omitted when the recording medium is not used as the memory area in displaying the display picture data including one picture. Further, reading size is smaller than that of the main picture data even when the recording medium is used as the memory area. The reading time can be shortened. Time required for extension processing can be shortened since the size of a picture to be extended can be significantly smaller than that of the main picture data.

Moreover, there is an embodiment that the display picture management unit generates "display picture data including a group of pictures in which a plurality of pictures are pasted on a display frame region" as the display picture data in order to temporarily store it in the memory area. By doing this, when the display picture data including pictures is displayed, reading processing of it is the same as that of the display picture data including one picture. It is possible to omit various processing required in the prior art for reproducing the display picture data including a group of pictures, that is, reading processing of pictures equal to number of pieces displayed on one screen from the recording medium, extension processing of the read pictures, and resize processing to arbitrary size.

Besides, there is an embodiment that the display picture management unit generates "display picture data including pictures in which a plurality of pictures are pasted on a display frame region" and "display picture data including one picture matched with a display frame region" as the display picture data in order to temporarily store them in the memory area.

Additionally, there is an embodiment that the display picture management unit divides the memory area into plural areas to temporarily store the display picture data including a group of pictures and the display picture data including one picture in the respective divided memory areas. By doing this, the respective memory areas are divided definitely so as to facilitate management of the display picture data and reading at the time of reproduction.

Furthermore, there is an embodiment that the memory area is at least one of an external memory provided outside the semiconductor integrated circuit, an internal memory incorporated in the semiconductor integrated circuit and a recording medium provided outside the semiconductor integrated circuit to be accessible by the semiconductor integrated circuit. Herewith, reading processing of the display picture data and resize processing for display can be shortened, when picture data is temporarily stored in the internal memory or the external memory.

Likewise, there is an embodiment that the memory area is a recording medium provided outside the semiconductor integrated circuit to be accessible by the semiconductor integrated circuit, and the display picture management unit deletes the display picture data temporarily stored in the recording medium when the power source of the semiconductor integrated circuit is turned off. By doing this, the display picture data is temporarily stored adamantly for display. When the power source is turned off to stop display, the storage capacity of the memory area can be secured through deleting the display picture data from the memory area.

According to the present invention, when picture data is recorded with imaging:
  The display picture data is generated aside from recording of the main picture data onto the recording medium.
  The generated display picture data is temporarily stored in the memory area.
  The display picture data generated by the number of pixels matched with predetermined display size is temporarily stored in the memory area.

According to the operations described above, in reproduction mode, the display processing speed of the display picture data can be higher than the case where display picture data is generated after reading main picture data from a recording medium.

A picture recording device according to the present invention is useful as a technique increasing the display processing speed of display picture data for main picture data concerning imaging and recording regardless of a still picture and a moving picture in a digital camera, an electronic still camera, and so on.

BRIEF DESCRIPTION OF THE DRAWINGS

Other objects of the present invention will be apparent by understanding an embodiment described from now on and will be clarified in the attached claims. Embodying this invention will remind those skilled in the art of a great number of advantages that are not mentioned in this specification.

FIG. 1 is a block diagram showing the configuration of a picture recording device according to an embodiment of the present invention;

DETAILED DESCRIPTION OF THE INVENTION

Figure 2:
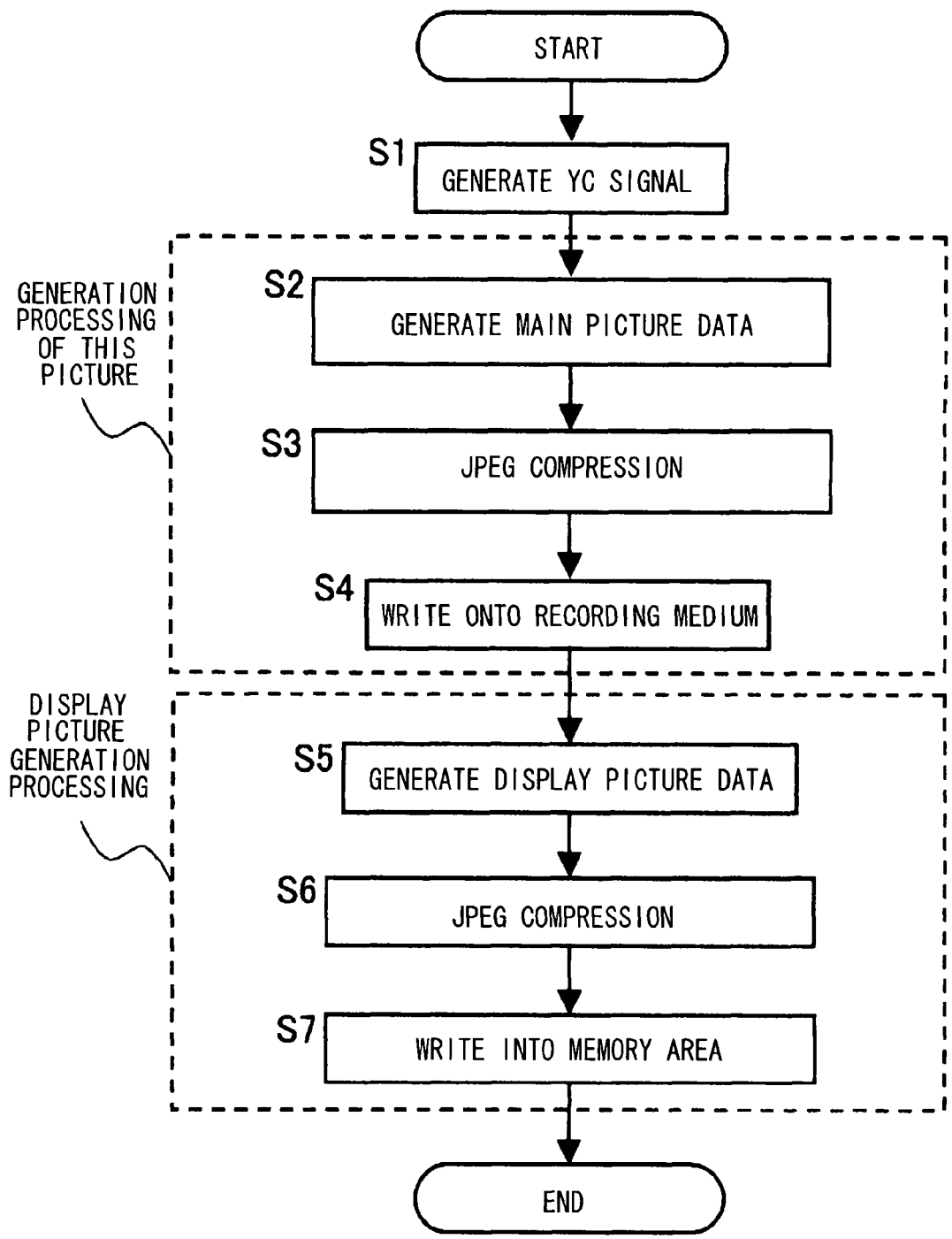
FIG. 2 is a flowchart showing the operation at the time of recording in the picture recording device according to the embodiment of the present invention.

Hereinafter, an embodiment of a picture recording device according to the present invention will be described in detail based on the drawings. FIG. 1 is a block diagram showing the configuration of the picture recording device according to the embodiment of the present invention.

In FIG. 1, the reference numeral 1 denotes a lens of an optical system for focusing light. The reference numeral 2 denotes an image pickup device receiving the light focused by the lens 1 and converting it to an electric signal representing a picture to output it. The reference numeral 3 denotes an imaging processing unit drives to control the imaging device 2, and at the same time performs compensation processing such as removing noise of the electric signal outputted from the imaging device 2, and then converting it to YC data representing brightness/color difference to output it. The reference numeral 4 denotes a zoom processing unit resizing the YC data by enlarging/reducing the YC data outputted from the imaging processing unit 3. The reference numeral 5 denotes a picture data compression/extension processing unit performing picture data compression processing and compressed data extension processing. The reference numeral 6 denotes a display picture processing unit performing signal conversion processing matched with display. The reference numeral 7 denotes a picture display unit such as LCD displaying a signal outputted from the display picture processing unit 6. The reference numeral 8 denotes an internal memory including a volatile memory such as a DRAM (Dynamic Random Access Memory) or an SRAM (Static Random Access Memory). The reference numeral 9 denotes an external memory including a DRAM. The reference numeral 10 denotes a recording medium (portable recording medium) consisting of a removable SD card or a flash memory. Various information such as picture data outputted from the respective processing units and picture data during processing are stored temporarily in The internal memory 8 and the external memory 9. Recording processing of the photographed picture data and reading processing of the recorded picture data are carried out to the recording medium 10. The reference numeral 11 denotes a CPU (Central Processing Unit) performing control of the entire picture recording device such as data transfer or computation processing. The reference numeral 12 denotes a display picture management unit generating display picture data, setting plural (in this case, two) display picture areas including an area for display picture data including one picture and an area for display picture data including a group of pictures in a memory area, and thereafter temporarily storing the picture data in the display picture areas. In the above configuration, the imaging processing unit 3, the zoom processing unit 4, the picture data compression/extension processing unit 5, the display picture processing unit 6, the internal memory 8, the CPU 11 and the display picture management unit 12 are incorporated into a semiconductor integrated circuit A.

Next, the recording operation of the thus configured picture recording device of this embodiment will be described with reference to the flowchart shown in FIG. 2. When the user presses the shutter of the imaging device in step S1, an electric signal where photoelectric conversion carried out by the imaging device 2 is outputted. The electric signal receives various compensations by the imaging processing unit 3 to generate YC data. Then, in step S2, main picture data including main picture data and thumbnail picture data smaller than the main picture data is generated from the YC data generated in step S1. The main picture data is generated by the zoom processing unit 4. Thereafter, in step S3, the main picture data (the main picture data and the thumbnail picture data) generated in step S2 is compressed through JPEG. Compression processing through JPEG is performed by the picture data compression/extension processing unit 5. Then, in step S4, the main picture data compressed in step S3 is written onto the recording medium (SD card) 10. In step S5, after writing it onto the recording medium 10, display picture data is generated from the YC data generated in step S1. The display picture data is generated by the zoom processing unit 4. After that, in step S6, the display picture data generated in step S5 is compressed through JPEG. Compression processing through JPEG is performed by the picture data compression/extension processing unit 5. Then, in step S7, the display compressed picture data generated in step S6 is temporarily stored in the memory area (internal memory/external memory/recording medium). The temporarily storing processing is performed with the display picture management unit 12.

When the picture data recorded at the time of recording processing is displayed on the picture display unit 7, the display picture data is generated at the same time with generation of the main picture data, and then the picture of the display picture data is displayed on the picture display unit 7. In short, the display picture data is not generated in step S5, the display picture data that has been already generated is compressed through JPEG in step S6 and thereafter is temporarily stored in the memory area in step S7.

In the above description of this embodiment, such procedure is taken as the recording processing that [generation of the display picture data] is performed after [generation of the main picture data written onto the recording medium]. The display picture data can be also generated first. Additionally, the memory area temporarily storing it is divided into an address area for display picture data including one picture and an address area for display picture data including a group of pictures. And then, the corresponding picture data are stored in the respective address areas. Management of the display picture data can be simplified through definitely dividing the memory area into the respective address areas (memory areas). Herewith, reading at the time of reproduction can be easily done.

The recording processing will be described below at a more specific level.

[In the Case of One Picture]

Figure 3:
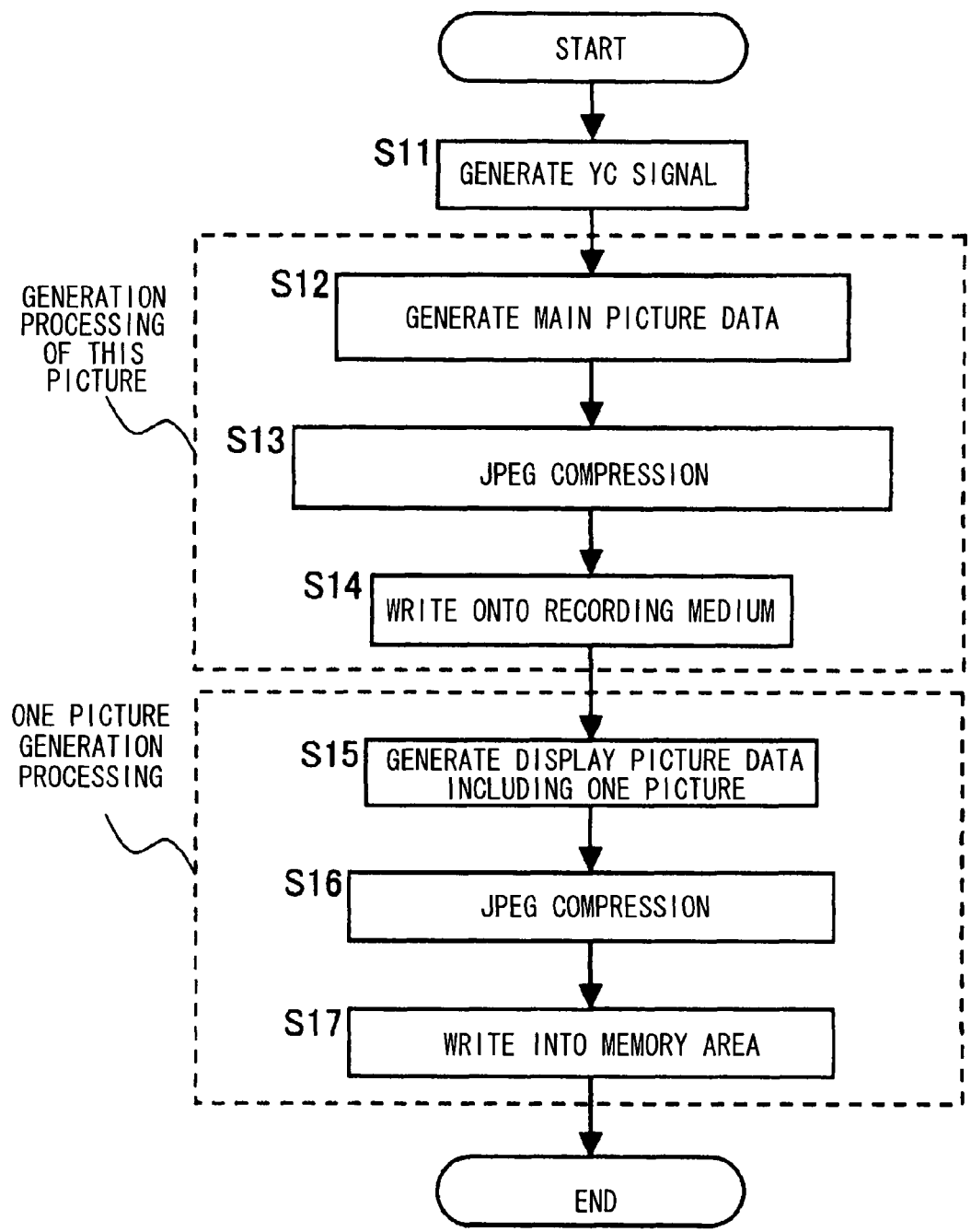
FIG. 3 is a flowchart showing the operation at the time of recording in the case of generating display picture data including one picture in the picture recording device according to the embodiment of the present invention.

The operation of recording processing in generating display picture data including one picture as display picture data will be described with reference to the flowchart of FIG. 3. The flowchart corresponds to the one where FIG. 2 is described in more detail. When the user presses the shutter in the imaging device, an electric signal where photoelectric conversion carried out by the imaging device 2 is flowed, compensation is performed by the imaging processing unit 3, and YC data is generated in step S11. Next, in step S12, main picture data including main picture data and thumbnail picture data smaller than the main picture data is generated by the zoom processing unit 4 from the YC data generated in step S11. Then, in step S13, the main picture data (the main picture data+the thumbnail picture data) generated in step S12 is compressed through JPEG in the picture data compression/extension processing unit 5. In step S14, the main picture compressed data compressed in step S13 is written onto the recording medium (SD card) 10. Thereafter, in step S15, after the completion of writing it onto the recording medium 10, the main picture data is resized to display size in the zoom processing unit 4 from the YC data generated in step S11 to generate display picture data including one picture for display. Next, in step S16, the display picture data generated in step S15 is compressed through JPEG in the picture data compression/extension processing unit 5. Then, in step S17, the display picture compressed data generated in step S16 is temporarily stored in the memory area by the display picture management unit 12.

Furthermore, when the picture recorded at the time of recording processing is displayed on the picture display unit 7, the display picture data is generated together with generation of the main picture data, and the generated display picture data is displayed on the picture display unit 7. In short, the display picture data is not generated again in step S15, the display picture data that has been already generated is compressed through JPEG in step S16, and then the display compressed picture data generated in step S16 is temporarily stored in the memory area by the display picture management unit 12 in step S17.

[In the Case of a Group of Pictures]

Figure 4:
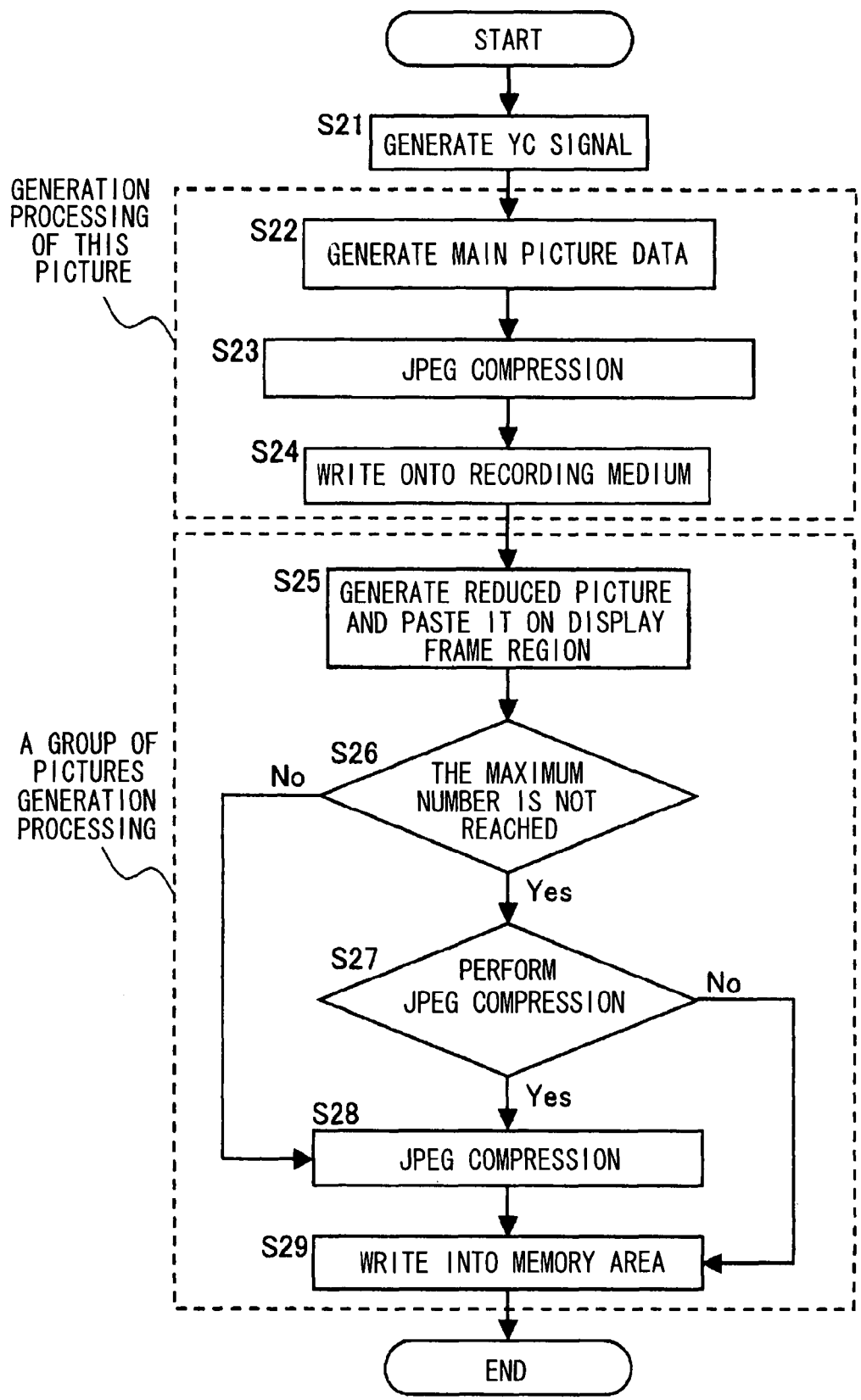
FIG. 4 is a flowchart showing the operation at the time of recording in the case of generating display picture data including a group of pictures in the picture recording device according to the embodiment of the present invention.

Next, the recording processing in generating display picture data including a group of pictures as display picture data will be described with reference to the flowchart of FIG. 4. The flowchart corresponds to the one where FIG. 2 is described in more detail.

When the user presses the shutter of the imaging device, an electric signal where photoelectric conversion is carried out with the imaging device 2 is outputted in step S21. The electric signal is compensated with the imaging processing unit 3 so as to generate YC data. Then, in step S22, main picture data including a main picture and a thumbnail picture smaller than the main picture is generated from the YC data generated in step S21. The main picture data is generated in the zoom processing unit 4. After that, in step S23, the main picture data (the main picture and the thumbnail picture) generated in step S22 is compressed through JPEG. JPEG compression is performed in the picture data compression/extension processing unit 5. Thereafter, in step S24, the main picture compressed data compressed in step S23 is written onto the recording medium (SD card) 10. Then, after the completion of writing it onto the recording medium 10, in step S25, the main picture compressed data is resized (reduced) to the size of arbitrary picture data, and the reduced data (picture) is pasted on the display frame region so as to generate display picture data. The picture data is resized in the zoom processing unit 4.

Next, in step S26, it is determined whether the number of pictures in the generated display picture data is the maximum pieces that can be pasted on the display frame region. The maximum number refers to the maximum value of the number of the pictures pasted on the display picture data of a group of the pictures in the display frame region. When the number of the pictures in the display picture data is not the maximum pieces, the processing is advanced to step S27 to determine whether or not the display picture data including pictures is compressed. When it is judged to compress, the processing is advanced to step S28 to compress the display picture data generated in step S25 through JPEG. JPEG compression is performed in the picture data compression/extension processing unit 5. Then, in step S29, the display compressed picture data generated in step S28 is temporarily stored in the memory area. Temporarily storing processing is performed with the display picture management unit 12. When it is determined not to compress in step S27, in step S29, the display picture data (data of pictures) generated in step S25 is temporarily stored in the memory area without being compressed. Temporarily storing processing is performed with the display picture management unit 12.

When it is judged to reach the maximum number in step S26, the processing is advanced to step S28 to compress the display picture data including pictures through JPEG. JPEG compression processing is performed in the picture data compression/extension processing unit 5. The display compressed picture data generated in step S28 is temporarily stored in the memory area in step S29. Temporarily storing processing is performed with the display picture management unit 12. In the above description, it is assumed that the memory used as the memory area can be selected from three of the internal memory 8, the external memory 9, and the recording medium (SD card) 10.

As described above, when the display picture data including a group of pictures is compressed to be temporarily stored in the case that the number of the pictures is less than the maximum, the once compressed display picture data including a group of pictures need to compress again through extending to paste on the display frame region with respect to each recording processing. In this embodiment, by leaving the display picture data including a group of pictures without compression, compressing/extending processing of the display picture data including pictures can be omitted at the time of recording processing in the case that the number of the pictures is less than the maximum. Herewith, the processing time can be shortened.

[Reproduction Mode]

Figure 5:
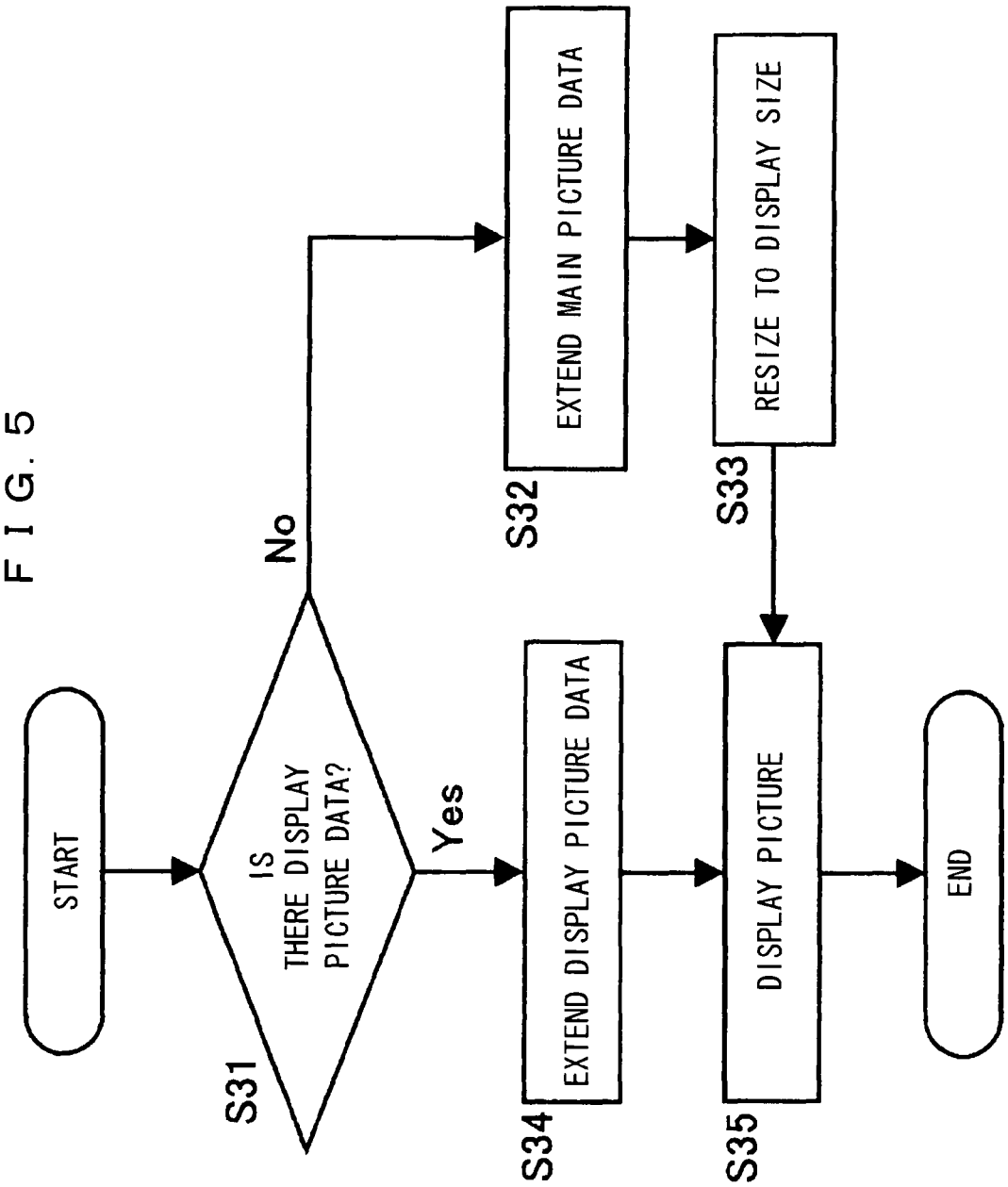
FIG. 5 is a flowchart showing the operation of picture display processing at the time of reproduction of the picture recording device according to the embodiment of the present invention.

Next, the processing of reproduction mode displaying picture data will be described with reference to the flowchart of FIG. 5. When the user selects reproduction mode, in step S31, the presence or absence of display picture data is determined. When the absence of the display picture data is determined, the processing is advanced to step S32 to read picture data from the recording medium (SD card) 10 for implementing extension processing of main picture data. Extension processing is performed in the picture data compression/extension processing unit 5. Then, in step S33, the picture size of the data extended in step S32 is resized to display size. Resize processing is performed in the zoom processing unit 4. After that, in step S35, the picture generated in step S33 is displayed on the picture display unit 7.

When the presence of display picture data is determined in step S33, the processing is advanced to step S34. The display picture data is read from the memory area and then implementing extension processing to the read display picture data. Extension processing is performed in the picture data compression/extension processing unit 5. Thereafter, in step S35, the display picture data generated in step S34 is displayed on the picture display unit 7.

As described above, as the display picture data, there is display picture data in which one picture is resized to a display frame region, or display picture data including a group of pictures in which a plurality of pictures are pasted on a display frame region.

Next, processing will be described when the power source is turned off. When the power source is turned off after performing recording processing of a plurality of pictures, it is determined whether display picture data is stored in the recording medium (SD card) 10. When it is determined not to be stored, processing for turning off the power source is performed as it is. When it is determined to be stored, all the display picture data stored in the recording medium (SD card) 10 are deleted to perform the processing for turning off the power source.

A most preferred specific example of this invention is described above in detail. The combination and arrangement of components of the preferred embodiment can be changed in various ways without departing from the spirit and scope of this invention claimed later.

What is claimed is:

1. A semiconductor integrated circuit used for a picture recording device for recording main picture data photographed by an image pickup device onto a recording medium, the semiconductor integrated circuit comprising:

an imaging processing unit for signal-processing said main picture data outputted from said image pickup device;

a zoom processing unit for performing picture resize processing in said main picture data signal-processed by said imaging processing unit;

a display picture management unit for generating display picture data from the main picture data resized by said picture resize processing performed by said zoom processing unit, aside from said main picture data recorded onto said recording medium at the time of photographing, and then temporarily storing said display picture data in a memory area set inside or outside said semiconductor integrated circuit; and a display picture processing unit for performing display processing to said main picture data and said display picture data, a picture data compression-extension processing unit for compressing said display picture data, wherein:

the compressed display picture data are stored in said memory area, said display picture management unit generates at least any one of "display picture data including pictures in which a plurality of pictures are pasted on a display frame region" and "display picture data including one picture matched with a display frame region" as said display picture data, said picture data compression-extension processing unit compresses said display picture data, and then said display picture management unit stores the compressed display picture data in said memory area, said "display picture data including a group of pictures in which a plurality of pictures are pasted on a display frame region" and "display picture data including one picture matched with a display frame region" are generated as said display picture data so as to temporarily store them in said memory area, and when said "display picture data including a group of pictures in which a plurality of pictures are pasted on a display frame region" is generated as said display picture data, said display picture management unit temporarily stores said display picture data including a group of pictures in said memory area without compressing said display picture data in the case where said main picture data has not been obtained up to a maximum number of said pictures pasted in said display frame region of said group of pictures.

2. The semiconductor integrated circuit according to claim 1, wherein said display picture management unit divides said memory area into plural areas so as to temporarily store said display picture data including a group of pictures and said display picture data including one picture in the respective divided memory areas.

3. The semiconductor integrated circuit according to claim 1, wherein said memory area is at least one of an external memory provided outside said semiconductor integrated circuit, an internal memory incorporated in said semiconductor integrated circuit, and a recording medium provided outside said semiconductor integrated circuit to be accessible by said semiconductor integrated circuit.

4. The semiconductor integrated circuit according to claim 1, wherein:

said memory area is a recording medium provided outside said semiconductor integrated circuit to be accessible by said semiconductor integrated circuit; and said display picture management unit deletes said display picture data temporarily stored in said recording medium when a power source of said semiconductor integrated circuit is turned off.

* * * * *